US008032719B2

(12) United States Patent
Bowers

(10) Patent No.: US 8,032,719 B2
(45) Date of Patent: Oct. 4, 2011

(54) METHOD AND APPARATUS FOR IMPROVED MEMORY MANAGEMENT IN DATA ANALYSIS

(75) Inventor: Matthew A. Bowers, Waterlooville (GB)

(73) Assignee: Tektronix International Sales GmbH, Schaffhausen (CH)

(*) Notice: Subject to any disclaimer, the term of this patent is extended or adjusted under 35 U.S.C. 154(b) by 410 days.

(21) Appl. No.: 10/907,769

(22) Filed: Apr. 14, 2005

(65) Prior Publication Data
US 2006/0236046 A1    Oct. 19, 2006

(51) Int. Cl.
G06F 12/00    (2006.01)
G06F 13/00    (2006.01)
G06F 13/28    (2006.01)

(52) U.S. Cl. .................................... 711/154
(58) Field of Classification Search .......... None
See application file for complete search history.

(56) References Cited

U.S. PATENT DOCUMENTS

| 5,748,174 | A  | * | 5/1998  | Wong et al. ............. 715/798 |
| 6,757,796 | B1 | * | 6/2004  | Hofmann ................. 711/159 |
| 2002/0154691 | A1 | * | 10/2002 | Kost et al. ............ 375/240.01 |
| 2004/0028131 | A1 | * | 2/2004  | Ye et al. .............. 375/240.11 |
| 2005/0080497 | A1 | * | 4/2005  | Rao ....................... 700/94 |
| 2006/0136446 | A1 | * | 6/2006  | Hughes et al. .......... 707/101 |
| 2006/0182357 | A1 | * | 8/2006  | Liu et al. ............... 382/239 |

FOREIGN PATENT DOCUMENTS
WO    WO 02/17644    2/2002

OTHER PUBLICATIONS

European Search Report and Written Opinion on European Patent Application No. EP 06 25 2036 dated Feb. 2, 2009.
J. Ribas-Corbera et al., "A flexible decoder buffer model for jvt videio coding" IEEE ICIP 2002, vol. 2, Sep. 22, 2002, pp. 493-496.
Gauthier Lafruit et al., "Implications of Expiration Time Stamp/Object Lifetime on Memory Management" Video Standards and Drafts, ISO/IEC JTC1/SC29/WG11, No. N2806, Oct. 19, 1997.
M J Carey et al., "Priority in DBMS resource scheduling" Proceedings of the Fifteenth International Conference on Very Large Data Bases, Amsterdam, Netherlands, Aug. 22, 1989, pp. 397-410.

* cited by examiner

Primary Examiner — Kevin Ellis
Assistant Examiner — Chad Davidson
(74) Attorney, Agent, or Firm — Marshall, Gerstein & Borun LLP

(57) ABSTRACT

A method of managing a memory resource is provided for the storage of a plurality of sequentially received data elements, each data element comprising a plurality of data integers, the method comprising prior to storing a received data element, checking if the available storage capacity of the memory resource is less than a predetermined threshold value and in response to the available storage capacity being less than the predetermined threshold value, deleting at least one data integer from at least one of the data elements stored in the memory resource.

9 Claims, 3 Drawing Sheets

METHOD AND APPARATUS FOR IMPROVED MEMORY MANAGEMENT IN DATA ANALYSIS

BACKGROUND TO THE INVENTION

Many consumer products now provide the facility to reproduce digitally encoded data, examples of such consumer products including personal stereos (such as MP3 players), mobile phone handsets, video conferencing facilities, digital and cable television and desktop computers. The digital data may be provided in the form of pre-recorded data retrieved from a storage medium, such as a CD, DVD or CD-ROM.

As will be appreciated by those skilled in the art, the amount of digital data required to record and/or transmit any given data item will vary depending upon a number of factors. However, for the stored or transmitted data to be reproduced some form of compression of the data is typically required to facilitate storage/transmission. In an effort to ensure a minimum standard of data transmission and data quality is provided to the consumer and to also try to ensure a maximum degree of interoperability between different manufacturers' equipment, a number of industry standards have been developed specifying the parameters to which the data compression must comply. Examples of such standards include H.264/AVC, MPEG-4, MPEG-2, H263+, H263 and H.261.

A common feature of the above-mentioned compression standards is that the compression, and hence the decompression, of any given data segment (the definition of what constitutes a data segment varying in dependence on the data type e.g. for video data a segment may comprise an individual frame) often utilises data from one or more previous data segments. Whilst it is known to perform a number of tests and data analysis procedures to ensure compliance of a newly developed encoder and/or decoder to the standards and interoperability with other vendors' compression algorithms, these procedures yielding valuable data concerning the performance of the newly developed encoder/decoder, the decompressed data itself generated by the decoder is rarely saved and is thus not available for subsequent analysis. This is because, in general, the amount of data memory required to store the decompressed data is prohibitive, this being one of the main reasons for the data being compressed initially. Consequently, one function that is difficult to provide without the use of large amounts of memory is that of rewinding or stepping back through the decompressed data a segment at a time.

It is known in the prior art to provide data analysis tools or players that allow a user to re-start the data playback from a previous point. This is possible only if the data stream includes an appropriate number of 'entry points', which are points in the data stream that require no previous information to allow decoding to resume. For video data such entry points typically occur at the beginning of different scenes, thus allowing a user to step-back through the video data a scene at a time. However, this scheme does not allow a frame by frame rewinding of the video data that would be more beneficial in detailed analysis. Furthermore, not all video data streams are encoded with such entry points, rendering any kind of rewind or step-back practically impossible.

SUMMARY OF THE INVENTION

According to a first aspect of the present invention there is provided a method of managing a memory resource provided for the storage of a plurality of received data elements, each data element comprising a plurality of data integers, the method comprising prior to storing a received data element, checking if the available storage capacity of the memory resource is less than a predetermined threshold value and in response to the available storage capacity being less than the predetermined threshold value, deleting at least one data integer from at least one of the data elements stored in the memory resource.

The data storage capacity utilisation may be measured in terms of the percentage of available memory used. The storage capacity utilisation threshold may be a user definable variable.

Each data integer for a respective data element preferably has an associated priority level and the step of deleting the one or more of the data integers may then comprise deleting only those data integers having a predetermined priority level.

In a further embodiment, the step of deleting one or more data integers may comprise identifying data integers having the predetermined priority level that are associated with the least recently decoded data elements. In this way the oldest data is deleted first, on the assumption that users will wish to step back from the most recently decoded data point.

The above method is preferably implemented as a computer program comprising a plurality of computer executable instructions that when executed by a computer cause the computer to perform the above method.

The computer program may be embodied on a program carrier, the program carrier comprising a data storage medium.

According to a second aspect of the present invention there is provided apparatus for managing a memory resource, the memory resource being arranged to store of a plurality of received data elements, each data element comprising a plurality of data integers, the apparatus comprising a memory management unit arranged to determine if the available storage capacity of the memory resource is less than a predetermined threshold value and in response to the available storage capacity being less than the predetermined threshold value, delete at least one data integer from at least one of the data elements stored in the memory resource.

Additionally, the data integers may have an associated priority level and the data storage management unit may be arranged to delete only those data integers having a predetermined priority level.

In a further preferred embodiment, the data storage management unit is further arranged to identify data integers having the predetermined priority level that are associated with the least recently decoded data element.

BRIEF DESCRIPTION OF THE DRAWINGS

Embodiments of the present invention will now be described below by way of illustrative example only with reference to the accompanying figures of which.

DESCRIPTION OF EMBODIMENTS OF THE INVENTION

The following embodiments are described in relation to video data, for ease of explanation and understanding by the reader. However, it will be appreciated that the present invention is equally applicable to other encoded data.

In embodiments of the present invention an encoded video data stream is decoded and analysed using an analysis tool such as the tool marketed by the current assignee under the name 'Vprove'. In addition to the decoded image data further analysis data is generated by the analysis tool that may be subsequently examined by a user. Consequently, the amount of decoded data relating to each video frame can be substantial—in the order of tens of megabytes. A proportion of this data is stored in a temporary memory store (buffer) associated with the computing entity running the analysis tool. Typically the RAM of a microprocessor based computer is used. The data held in the buffer relates to a number (dependent on the buffer capacity and video resolution, among other factors) of the most recently decoded video frames.

Figure 1:
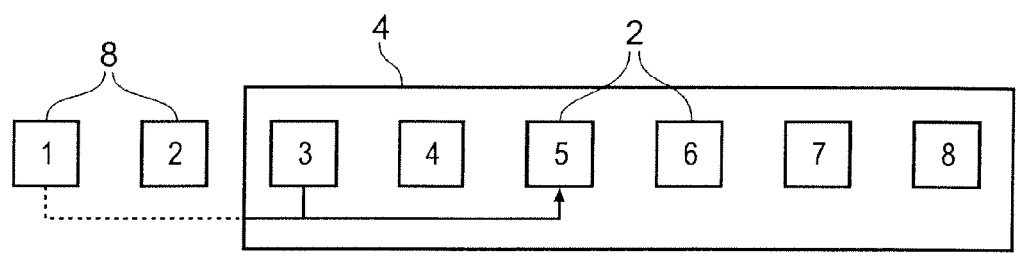
FIG. 1 schematically illustrates the contents of a data buffer in accordance with an embodiment of the present invention.

However, the buffer remains a finite resource and in typical implementations is not of sufficient capacity to store all the required data for the entirety of the data item (video sequence). This gives rise to the problem illustrated in FIG. 1, in which a number of decoded frames 2 are stored in a buffer 4. However, in FIG. 1 the capacity of the buffer has been exceeded such that the frames first decoded are no longer stored. These frames 8 are represented in FIG. 1 as being in the frame sequence but outside the buffer, although it will be appreciated that in reality such frames will have been simply overwritten by subsequently decoded frames in the buffer. Hence, if a user wishes to step-back to frames 1 or 2 the required information is no longer available in the buffer.

To help alleviate this problem use is made in embodiments of the present invention of the fact that the decoded data for each video frame comprises a number of different 'layers'. Examples of the different layers include the actual image data, macroblock statistics and basic data. Each data layer can be attributed a priority in terms of its persistence in the buffer. The basic data includes frame data that is used to support one or more of the analysis procedures performed by the analysis tool. Examples of basic data are the frame display time and number of bits used to encode the frame. Such data is important to support analysis of the decoding process as a whole, such as buffer analysis, and as such is desirable to keep available at all times. The basic data is therefore categorized as being of high priority. Conveniently, the basic data is typically small in terms of its memory requirements. On the other hand, the image data includes the raw decoded pixel data that is provided when the individual frame is actually displayed on an appropriate display device and thus tends to consume a large amount of the buffer memory. However, since much of the image data can often be reproduced from data relating to other video frames, it is therefore given a low priority. The macroblock statistics data, which typically includes information concerning the motion coding employed for that frame and the associated motion vectors, tends to fall between the two extremes of the basic data and image data and is prioritised accordingly, depending on the particular implementation of the current invention. In addition, the use of layers of data for each frame facilitates further embodiments of the present invention in which new layers of data are added to the data stored in the buffer as it becomes available. For example, a new layer of data may be added as a result of performing a further analysis process on the decoded frames. The new data layer is assigned a corresponding priority, which may be an existing priority level or a new priority level, in which case the priority levels of the existing data layers may be re-assigned correspondingly.

Figure 2:
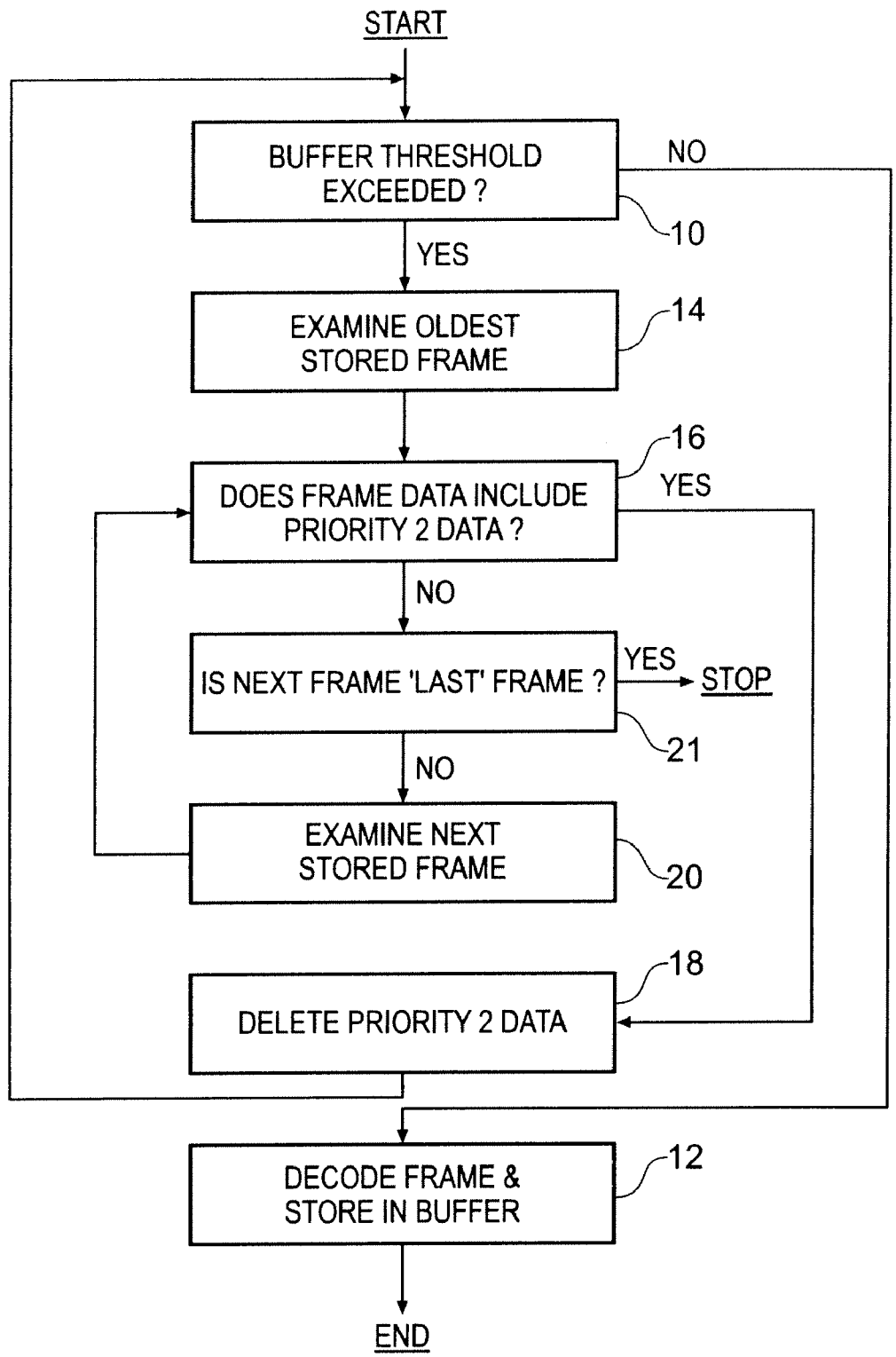
FIG. 2 schematically illustrates a method of memory management in accordance with an embodiment of the present invention.

FIG. 2 schematically illustrates by way of a flow chart a method of buffer memory management according to an embodiment of the present invention that is employed to alleviate the problem identified above. At a first step 10 the buffer is examined to determine if a threshold has been exceeded. The threshold represents a maximum memory usage beyond which it is probable that the data from a subsequently decoded video frame will result in an overflow of the buffer and a loss of data. The threshold may be set as a variable by a user or may be a fixed parameter expressed, for example, as a percentage of the total buffer capacity. If the threshold has not been exceeded then it naturally follows that decoding may continue as the next step 12, with the decoded data being stored in the buffer. The method would then restart at step 10. If it is determined at step 10 that the buffer threshold has been exceeded the method progresses to the next step 14 in which the data relating to the oldest decoded video frame stored in the buffer is examined. As mentioned above, the frame data comprises a number of prioritised layers. In the method illustrated in FIG. 2, only 2 priorities have been assigned, for the sake of simplicity; priority 1, representing data that must be maintained, and priority 2, representing data that may be discarded. The presence of any priority 2 data (data that may be discarded) in the data relating to the oldest stored frame is determined in a subsequent step 16. If any such priority 2 data is present it is deleted from the buffer in a subsequent step 18 and the method returns to the step of checking the buffer threshold. If the examined frame data does not include any priority 2 data that may be discarded, by virtue of an earlier application of the method, the next oldest frame data is examined in a subsequent step 20. Prior to the step 20 of examining the next stored frame, it is preferably first determined if the previously examined frame is the 'last' stored frame, i.e. the most recently decoded and stored. This is done at step 21. If this is the case, such that no further unexamined frames are available, then the procedure is halted. Consequently, as the buffer threshold is exceeded the low priority data relating to the oldest stored frame data is sequentially deleted from the buffer to allow further frame data from newly decoded frames to be stored.

It will be appreciated that a more complex deletion algorithm may be implemented in further embodiments of the present invention if more than two priority levels are applied. Such further deletion schemes may require one or more further conditions to be met before data is deleted. The generation of such deletion schemes will be dependent on the nature of the data layers and number of priority levels and as such are not described in further detail but are nonetheless encompassed by embodiments of the present invention.

Figure 3:
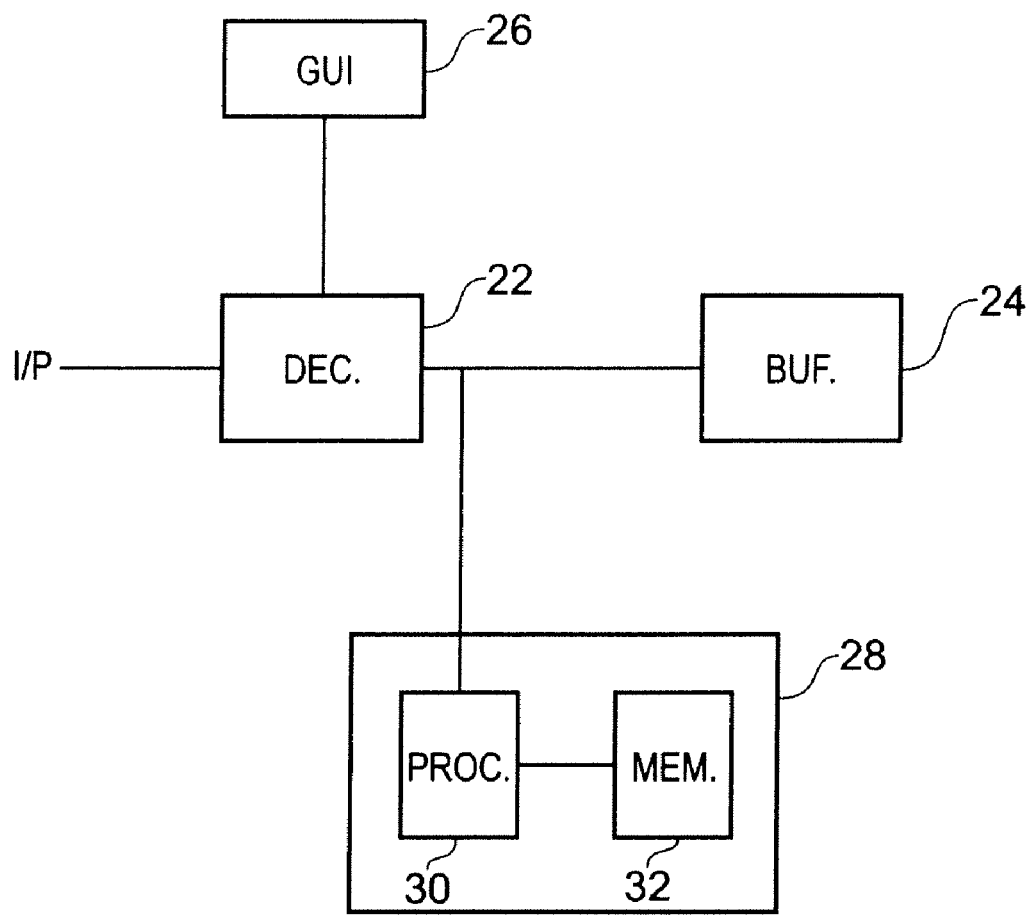
FIG. 3 schematically illustrates a memory management apparatus according to an embodiment of the present invention.

An implementation of a memory management system in accordance with embodiments of the present invention is illustrated in FIG. 3. Input data from a data storage medium or a data transmission channel is provided to a decoder 22. The decoder is in communication with a data buffer 24 in which the decoded frame data is stored. The operation of the decoder 22 may be controlled from a graphical user interface (GUI) 26, which may be displayed on a conventional monitor. A user operates the GUI to cause the decoder to decode data received at the input or to step-back through previously decoded frames as desired. Other functions may also be available to the user via the GUI. A memory management unit 28 is provided in communication with the decoder 22 and the buffer 24. The memory management unit 28 includes a processor 30 in communication with a further memory unit 32. The processor 30 monitors the state of the buffer 24 and deletes stored data in accordance with the method of the present invention described above. The further memory unit 32 stores the deletion criteria and may be accessible or updatable by a user via the GUI so that the deletion criteria may be varied as desired. The processor 30 preferably exerts control on the operation of the decoder 22 to avoid any access conflicts to the buffer between the decoder 22 and the memory management unit 28. It will be appreciated by those skilled in the art that the decoder 22 and memory management unit 28 may be implemented with a single processing entity arranged to perform both functions. The processor is preferably arranged to determine the point at which data being viewed from the buffer is about to be exhausted and to control the decoder 22 to resume decoding of the input data stream so that it is substantially imperceptible to a user at which point decoding of the data stream is resumed after stepping back through previous frames.

What is claimed as new and desired to be protected by Letters Patent of the United States is:

1. A method of managing a memory resource provided for the storage of a plurality of received video frames, the method comprising:

prior to storing a received video frame, checking if the available storage capacity of the memory resource is less than a predetermined threshold value, wherein each video frame comprises a plurality of data layers, at least one data layer comprising image data and at least one data layer comprising metadata, the metadata being data that provides information about the image data and wherein each data layer has an associated priority level which is a function of the importance of the data layer for the analysis of the video frames and is assignable independently of a priority level of every other data layer; and in response to the available storage capacity being less than the predetermined threshold value, deleting a data layer other than a data layer comprising metadata from at least one of the video frames stored in the memory resource without deleting a layer within that video frame comprising metadata.

2. A method according to claim 1, wherein the storage capacity utilization threshold comprises a user definable variable.

3. A method according to claim 1, wherein the step of deleting one or more of the data layers comprises deleting only those data layers having a predetermined priority level.

4. A method according to claim 3, wherein the step of deleting one or more data layers comprises identifying data layers having the predetermined priority level that are associated with the least recently decoded video frames.

5. An article of manufacture for managing a memory resource provided for the storage of a plurality of received video frames, the article of manufacture comprising:

a computer readable storage medium;
   a computer program comprising a plurality of computer executable instructions stored on the computer readable medium that when executed by a computer cause the computer to:
   prior to storing a received video frame, check if the available storage capacity of the memory resource is less than a predetermined threshold value, wherein each video frame comprises a plurality of data layers, each data layer having an associated priority level which is a function of the importance of the data layer for the analysis of the video frames and is assignable independently of a priority level of every other data layer, at least one data layer comprising image data and at least one data layer comprising metadata, the metadata being data that provides information about the image data; and
   in response to the available storage capacity being less than the predetermined threshold value, delete a data layer other than a data layer comprising metadata from at least one of the video frames stored in the memory resource without deleting a layer within that video frame comprising metadata.

6. Apparatus for managing a memory resource comprising:
   a memory management unit arranged to, prior to storing a received video frame, determine if the available storage capacity of the memory resource is less than a predetermined threshold value and in response to the available storage capacity being less than the predetermined threshold value, delete at least one data layer other than a data layer comprising metadata from at least one of the video frames stored in the memory resource without deleting a layer within that video frame comprising metadata,
   wherein each video frame comprises a plurality of data layers, at least one data layer comprising image data and at least one data layer comprising metadata, the metadata being data that provides information about the image data, each data layer having an associated priority level which is a function of the importance of the data layer for the analysis of the video frames and is assignable independently of a priority level of every other data layer.

7. Apparatus according to claim 6, wherein the data layers have an associated priority level and the memory management unit is arranged to delete only those data layers having a predetermined priority level.

8. Apparatus according to claim 7, wherein the memory management unit is further arranged to identify data layers having the predetermined priority level that are associated with the least recently decoded video frames.

9. An article of manufacture according to claim 5, wherein the computer is adapted to receive the computer program via a transmissible electromagnetic medium.

* * * * *